United States Patent [19]

Sabapathi et al.

[11] Patent Number: 5,572,669
[45] Date of Patent: Nov. 5, 1996

[54] BUS CYCLE SIGNATURE SYSTEM

[75] Inventors: Sreenivasan R. Sabapathi, Chuan Park; Robert S. L. Ng, Pasir Ris Gardens, both of Singapore

[73] Assignee: QMax Technologies PTE. Ltd., Singapore

[21] Appl. No.: 236,297

[22] Filed: May 2, 1994

[30] Foreign Application Priority Data

May 6, 1993 [GB] United Kingdom ............... 9309300

[51] Int. Cl.⁶ .................................................. H04B 17/00
[52] U.S. Cl. ................................... 395/183.21; 371/22.4
[58] Field of Search ..................... 395/183.01, 183.06, 395/183.08, 183.16, 183.21; 371/22.1, 22.4, 22.6, 27, 22.3

[56] References Cited

U.S. PATENT DOCUMENTS

| | | |
|---|---|---|
| 4,196,386 | 4/1980 | Phelps . |
| 4,455,654 | 6/1984 | Bhaskan et al. ................ 371/20.1 |
| 4,807,161 | 2/1989 | Comfort et al. . |
| 5,287,481 | 2/1994 | Lin ........................................ 395/425 |
| 5,329,471 | 7/1994 | Swoboda et al. . |
| 5,423,019 | 6/1995 | Lin ........................................ 395/425 |

FOREIGN PATENT DOCUMENTS

WO81/00475  2/1981  WIPO .................. G06F 11/00

*Primary Examiner*—Robert W. Beausoliel, Jr.
*Assistant Examiner*—Albert Décady
*Attorney, Agent, or Firm*—Klarquist Sparkman Campbell Leigh & Whinston

[57] ABSTRACT

A bus cycle signature system for testing CPU based boards comprising a data shift register and a general shift register which receive test signals from the board under test, the signals received by the shift registers being sampled by clock signals associated with bus cycle operations performed by a CPU on the board under test. The sampled signals form a board signature which can be compared with a similarly obtained signal from a known good board to detect faults in the board under test.

27 Claims, 3 Drawing Sheets

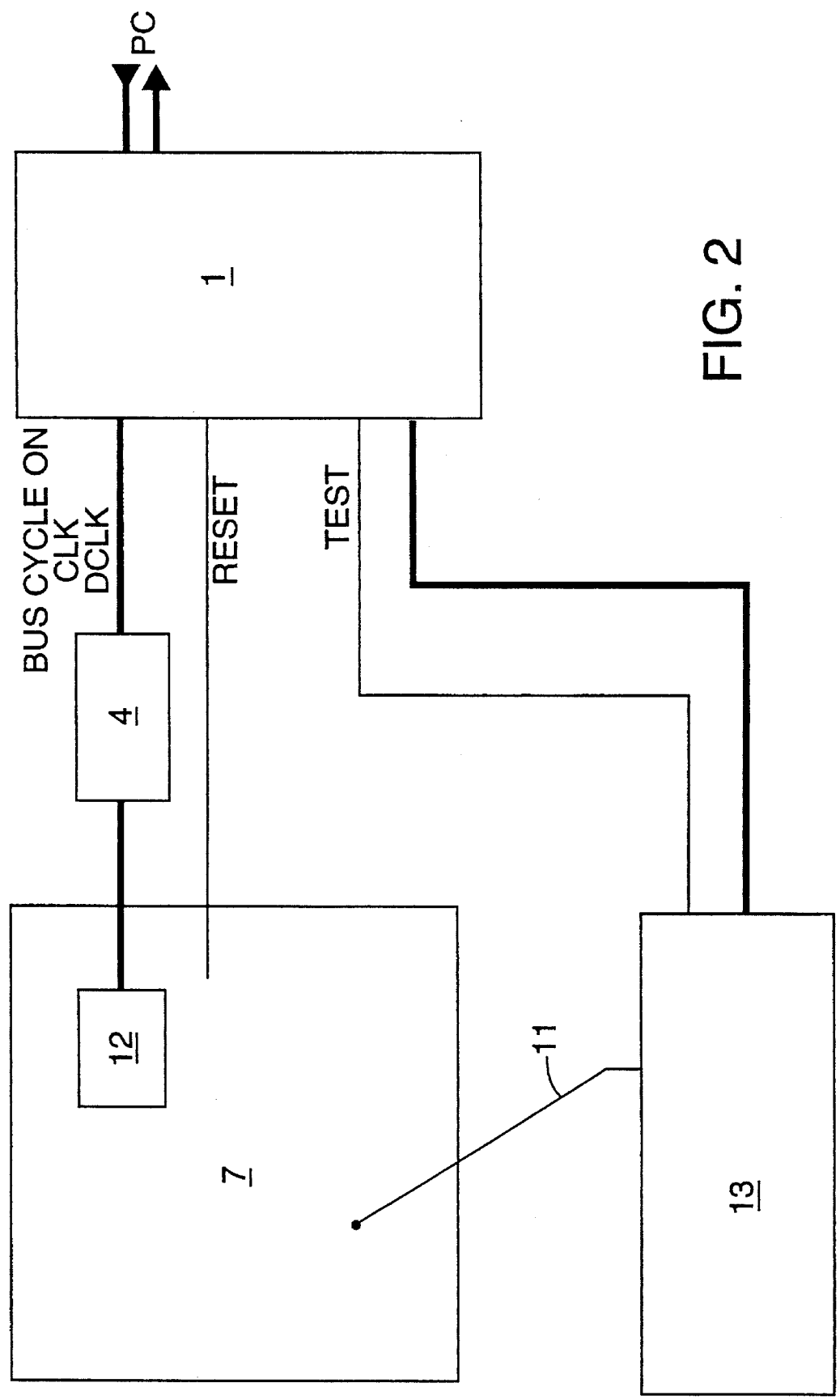

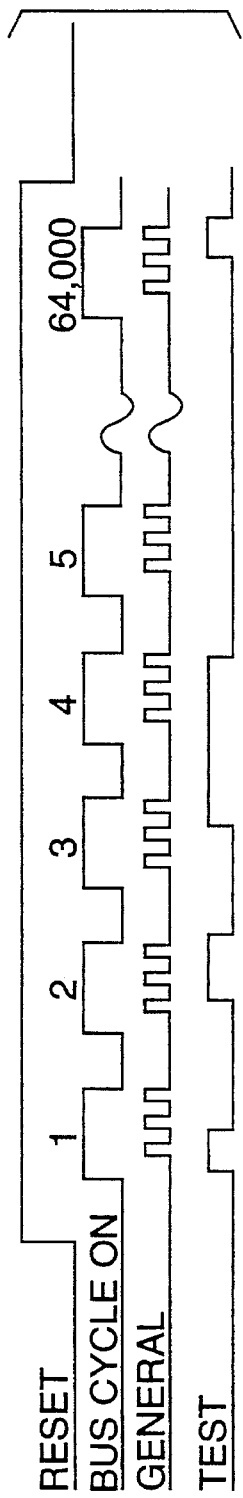
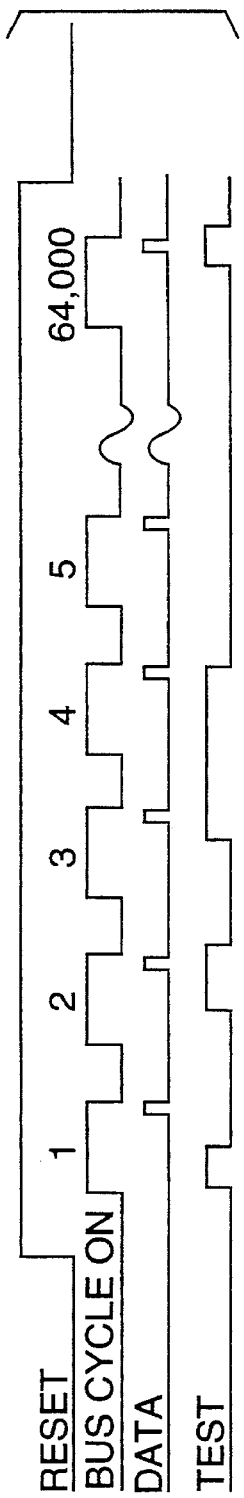
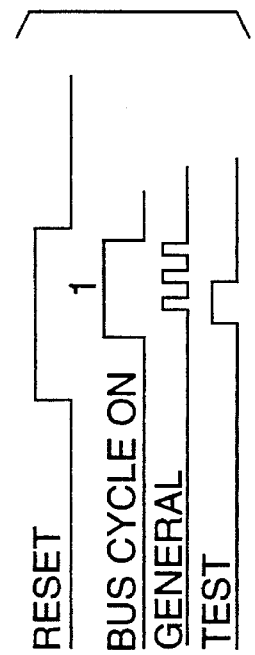
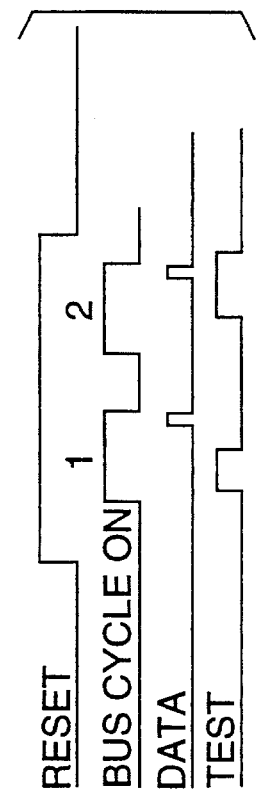

BUS CYCLE SIGNATURE SYSTEM

BACKGROUND OF THE INVENTION

The present invention relates to a bus cycle signature system and more particularly to a bus cycle signature system for automatically testing or debugging a central processing unit (CPU) based mother board.

The bus cycle signature system is for use in testing and trouble-shooting PCAT mother boards and other CPU based boards. The bus cycle signature system generates highly repeatable signature words for each node of a known good board which can then be stored in a database for comparison with a suspect board under test of the same type as the known good board for either quality assurance testing purposes or for the purpose of debugging the suspect board by identifying one or more faulty nodes.

Computer mother boards have grown to such a density and complexity that only a few expensive automatic test equipment (ATE) systems on the market can effectively test and trouble-shoot such boards. The mother board uses a CPU and a chipset comprising highly integrated application-specific integrated circuit (ASIC) chips with a small number of other support components. The clock speed of such a board is usually in the range of 33–50 MHz at present and the clock speed of future boards is expected to increase to a frequency of 66 to 100 MHz. Conventional ATE technology uses the following techniques:

1. An open/short circuit test
2. An in-circuit component measurement test
3. A digital in-circuit functional test An example of an in-circuit component measurement tester is the Tescon tester and an example of a digital in-circuit functional tester would be the Genrad Teradyne tester.

The open/short test is basically a test to ensure that there are no unintended electrical open circuits or short circuits in a non-populated (bare) printed circuit board (PCB). The open/short test is not suitable for use with a populated board and so alternative methods must be used to test a populated board. PCB manufacturing technology is of a high standard so faults such as open or short circuits in the bare PCB would not normally be expected. However, at a later stage in the manufacturing/production of PCBs, short circuits caused by solder bridges or open circuits caused by components not being soldered properly may result. This type of open/short circuit testing generally uses a bed of nails test fixture for testing and the extent and accuracy of the test depends on the number of test points (pins) provided in the fixture. When surface mount technology is used, the component population density can be very high and the pin pitch and hence the distance between test points is very small. Thus, such bed of nails test fixtures are more difficult to make and more costly. A bed of nails test fixture for a board which receives a plastic quad flat pack (QFP) would present even more difficulties due to the small distances between test points.

An in-circuit component measurement technique is capable of testing a populated board and uses either a three wire or a six wire method to measure the values of passive components such as resistors, capacitors, inductors, diodes and the like. This is a useful technique when applied to analogue boards but very few passive components are required with today's CPU based mother boards so this test method is unsuitable for such an boards.

A further alternative is a digital in-circuit functional test which either utilises back-driving techniques to test individual digital integrated circuits (IC) one at a time or, alternatively, the whole board is driven by the card edge connectors or by input connectors and the output of the board is evaluated when in operation.

Using the back-driving technique, the chip under test is driven by a test signals and the output of the chip is evaluated and compared with the expected response. This method requires separate programmes for each chip on the board which is to be evaluated. Moreover, a specific test programme must be written before custom chips can be tested in this matter. The testing of a mother board comprising many chips also requires knowledge of the complete logic details of each chip to be tested. However, in most cases the logic details of the mother board chipset will not be available. Even if available, it may take a long time before the test programme is ready and the chip may have been revised in this timescale so the test programme may also need to be revised before testing may take place. If such a test programme is readily available, the digital in-circuit function tester may test the chip at a much slower speed then the actual speed of the chip when operating in normal conditions. For example, a chip may be back-driven at a speed in the range of 1 to 5 MHz whereas, the actual operating speed of the chip when in use may be at 33 MHz. Thus, such a test does not give an indication of the actual performance of the board under its normal operating conditions. Generally, the faster the back-driving speed required, the more expensive the tester becomes.

The alternative method for digital in-circuit functional testing involves driving the board by the card edge connectors or by input connectors. This is called an inboard functional test. Using this method, it is possible to test a board at high operating speeds but, again, it is necessary to write a specific test programme for each type of board to be tested. Additionally, in the case of CPU based boards, it is necessary to synchronise the CPU on the board under test with the inboard functional tester.

Accordingly, the present invention proves an apparatus for testing a CPU based board having a plurality of test points and at least one clock producing a CPU clock signal, which apparatus comprises:

means for driving the CPU at its own clock speed;

probe means for providing a first signal from a test point;

means to provide a second signal indicative of the CPU performing a bus cycle;

sample means to provide a third signal associated with the CPU clock signal; and storage means to combine the first and the third signals when the second signal is indicative of the CPU performing a bus cycle thereby providing a signature in the storage means of the test point on the CPU based board.

BRIEF DESCRIPTION OF THE DRAWINGS

In order that the present invention may be more readily understood, an embodiment thereof will now described, by way of example, with reference to the accompanying drawings, in which:

FIG. 2 is a block diagram illustrating the bus cycle signature system of FIG. 1 connected to a board under test; and FIG. 3 comprises FIGS. 3a,b,c and d which are a set of timing diagrams obtained from the bus cycle signature system of FIG. 1.

DETAILED DESCRIPTION OF A PREFERRED EMBODIMENT OF THE INVENTION

Figure 1:
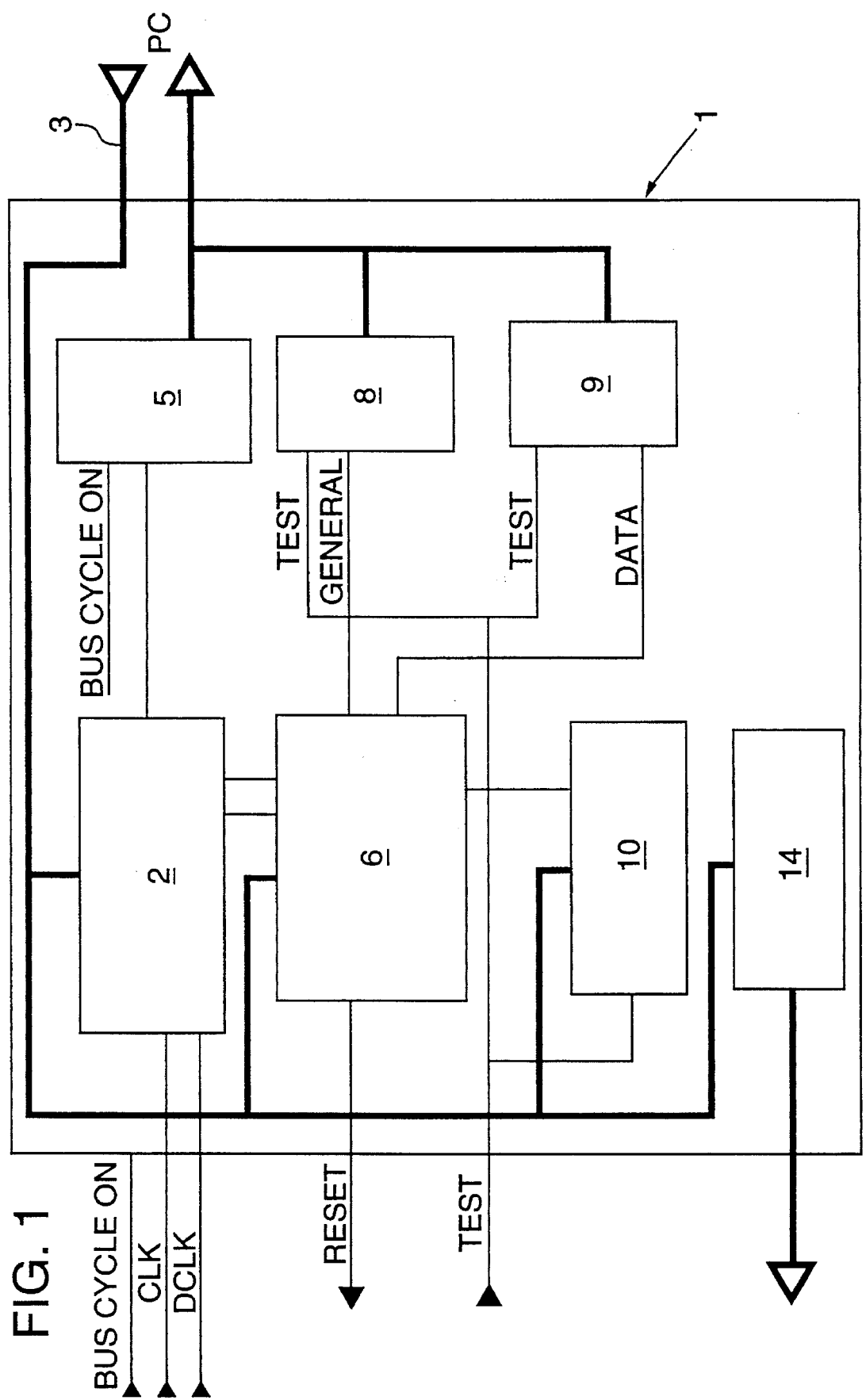
FIG. 1 is a system block diagram illustrating a bus cycle signature system according to one embodiment of the present invention.

The bus cycle signature system (1) of FIG. 1 includes a system controller (2) which monitors and controls the operation of the bus cycle signature system (1). The system controller (2) is connected via a bus line (3) to a host personal computer (PC) (not shown) which controls the overall operation of tests performed by the bus cycle signature system (1). In addition, the system controller (2) is connected to a personality adaptor (4) (shown in FIG. 2) which does not comprise an integral part of the bus cycle signature system unit (1). A bus cycle counter (5) is controlled by the system controller (2) and the function of the bus cycle counter (5) will be discussed below.

A timing generator (6) for driving a CPU based board (7) to be tested is controlled by the system controller (2) and is connected to the board (7) under test, to two shift registers (8,9) and to a signal transition detector (10). The first shift register comprises a general signature shift register (8) and the second shift register comprises a data signature shift register (9). Both shift registers (8,9) receive strobe signals from the timing generator (6) and are connected to a test probe (11) which provides a test signal from the board (7) under test. The transition detector (10) detects either a transition at the trailing edge or the leading edge of the test signal received from the board (7) under test and, in the present embodiment, detects the trailing edge of the test signal. As well as being connected to the bus cycle signature system (1), the board (7) under test is supplied with a power supply.

The personality adaptor (4) which is connected to the system controller (2) is also connected directly to the CPU (12) of the CPU based board (7) under test.

In operation, a board (7) to be tested, having a CPU (12), is connected to the bus cycle signature system (1) and driven by a RESET signal from the timing generator (6). The CPU (12) is monitored by the personality adaptor (4) and a test probe (11) is placed in electrical contact with a specific node of the board (7) to be tested. The probe (11) is connected to the bus cycle signature system (1) by a multiplexer (13) which selects which node of the board (7) under test is to be tested. The multiplexer (13) is controlled by a multiplexer controller (14) which is connected to the system controller (2). The bus cycle signature system (1) may be connected to the host PC which can monitor the progress and record the results of tests performed on the board (7) under test.

When the board (7) containing the CPU (12) is powered up, the basic input/output system (BIOS) of the board (7) initiates a system self-test and then achieves a stable operating state. The CPU (12) has one or more clocks depending upon the type of CPU (12) on the board (7). Each type of CPU (12) has its own characteristic bus status signals which indicate the type and status of each of the bus operations performed by the CPU (12). In order for the bus cycle signature system (1) to sample a useful test signal from the board (7) under test, it is necessary to know when the CPU (12) starts a bus cycle and when the CPU (12) terminates a bus cycle. The bus cycle signature system (1) therefore needs to be aware of the condition of the CPU (12) when the CPU (12) is performing a bus cycle. The personality adaptor (4) is connected to the CPU (12) via a CPU clip or fixture of the board (7) and receives signals from the CPU (12) which indicate the start and termination of a bus cycle. For example, a 286 CPU will produce an S0,S1 signal to indicate the start of a bus cycle and an RDY input signal input signal to signal the end of the bus cycle. A 386 CPU will produce an ADS signal as a start signal and an RDY signal as a stop signal. In response to the start and termination signals, which are dependent on the type of CPU (12) being tested, the personality adaptor (4) outputs a BUS CYCLE ON signal immediately after the CPU (12) starts a bus cycle and terminates the BUS CYCLE ON signal when the CPU (12) indicates that the bus cycle has been terminated. The BUS CYCLE ON signal is sent from the personality adaptor (4) to the bus cycle signature system (1).

The BUS CYCLE ON signal is representative of the CPU (12) performing a bus cycle. The BUS CYCLE ON signal is fed to the bus cycle counter (5) in the bus cycle signature system (1) which counts the number of BUS CYCLE ON signals received. A bus cycle count is produced by the bus cycle counter (5), each count representing the reception of a BUS CYCLE ON signal.

The personality adaptor (4) also provides the bus cycle signature system (1) with two clock signals. The first clock signal is the general strobe which comprises a strobe signal which is synchronised, by the personality adaptor (4), to the one or more clocks of the CPU (12). As more than two CPU clocks may be included in the board (7) under test, a plurality of signals at regular clocked intervals may be sent by the personality adaptor (4). The second signal comprises a data strobe which occurs only once in each bus cycle and then only at the time when data is valid during the bus cycle. Data is normally valid in the bus cycle when a READY signal is input to the CPU (12) and this normally occurs at the end of the bus operation—i.e at the end of the BUS CYCLE ON signal.

The general and data strobe clock signals, CLK and DCLK respectively, are sent from the personality adaptor (4) via the system controller (2) to the timing generator (6). The timing generator (6) which generates the RESET signal to drive the board (7) under test also provides the general strobe clock signal to the general shift register (8) and the data strobe clock signal to the data shift register (9). In the embodiment shown in FIG. 1, both shift registers (8,9) comprise 16-bit shift registers each of which is provided with a feedback loop.

To obtain a test signal, the test probe (11) is applied to a node of the board under test and the test signal is received from the node and sent directly to both the general shift register (8) and the data shift register (9). The test signal is sampled during a BUS CYCLE 0N signal, combined with the general strobe signal and input to the general shift register (8) and combined with the data strobe signal and input to the data shift register (9). When all sixteen bits of either of the shift registers have been filled, the sixteenth bit will be fed around the feedback loop to be combined with the seventeenth bit so that the new first bit in the shift register represents a product of the sixteenth and seventeenth bit. Thus, the new data which is shifted into the shift register contains some information from the older data which has been shifted out of the shift register. Therefore, the contents of the shift registers (8,9) represent a unique signature obtained for a specific number of shifts. Normally, the number of shifts will be predetermined by defining the number of bus cycle counts to be for example, 64,000.

The data strobe clock signal only occurs once in every bus cycle and normally occurs toward the trailing edge of each bus cycle. The data strobe clock signal is indicative of when the CPU (12) is performing a data valid bus operation. Thus, if a data bus node is to be sampled, then the data strobe clock signal should be used as this will give a repeatable signature whereas the general strobe clock signal may not produce a repeatable, stable sample signal.

FIG. 3a shows the signals produced by the bus cycle signature system to produce a general signature for 64,000 BUS CYCLE ON signals. The general signal is synchronised with the CPU clock signal and may occur more than once in a single BUS CYCLE ON signal. In contrast, the data signal used to produce a data signature occurs only once during each BUS CYCLE ON signal when data is valid during the BUS CYCLE ON signal as shown in FIG. 3b. The data signature produced by the signals shown in FIG. 3b is in respect of 64,000 BUS CYCLE ON signals.

The contents of the bus cycle counter (5), the general shift register (8) and the data shift register (9) may all be downloaded onto the host PC so that the signature obtained from a specific number of bus cycle counts may be recorded and compared with the signature obtained from a known good board for the same number of bus cycle counts. If the two signatures are not comparable then this provides an indication that the board (7) under test if faulty.

A further test that can be conducted by the bus cycle signature system (1) is to provide a signal transition bus signature. The transition detector (10) receives the test signal provided by the test probe (11). When the signal transition of the test signal (TEST) is detected (on the trailing edge), the transition detector (10) stops the sampling of the test signal. The specific signatures obtained at this signal transition, which are held in the general and data shift registers (8,9), and the count of the bus cycle counter (5) at which the signal transition occurred are downloaded onto the host PC. FIGS. 3c and 3d respectively show the signals used to produce a general transition signature detected on the first test signal transition and a data transition signal detected on the second test signal transition. Thus, the signal transition bus signature is generated by stopping the board (7) at the first transition of the signal rather than stopping the board (7) after a pre-determined number of bus cycle counts. This provides a signature which is indicative of the status of a particular node at a known time in the operation of the board (7) under test. This information is useful for enhancing the fault detection capacity of the system as the point at which the failure in the board (7) under test occurs can be located by comparing the signal transition bus signatures of a known good board with the signal transition bus signatures of the board (7) under test. The fault can be located by identifying the point at which the two signal transition bus signatures differ.

What is claimed is:

1. An apparatus for testing a CPU based board having a CPU, a plurality of test points and at least one clock producing a CPU clock signal at a first clock speed, the apparatus comprising:

means for driving the CPU at the first clock speed;

probe means for measuring a first signal from a test point on the CPU based board;

means communicative with the CPU to provide a second signal indicative of the CPU performing a bus cycle;

sample means communicative with the CPU to provide a third signal associated with the CPU clock signal; and storage means communicative with the probe means and the sample means, and operable to combine the first and the third signals when the second signal is indicative of the CPU performing a bus cycle thereby providing a signature in the storage means of the test point on the CPU based board.

2. An apparatus according to claim 1, wherein the first signal comprises the stream of bits passing the test point.

3. An apparatus according to claim 1, wherein the second signal comprises a BUS CYCLE ON signal.

4. An apparatus according to claim 1, wherein the second signal is initiated by a start signal from the CPU and terminated by a stop signal from the CPU.

5. An apparatus according to claim 4, wherein the CPU is a 286 CPU and the start signal is an S0,S1 signal and the stop signal is an RDY signal.

6. An apparatus according to claim 4, wherein the CPU is a 386 CPU and the start signal is an ADS signal and the stop signal is an RDY signal.

7. An apparatus according to claim 1, wherein-the means to provide the second signal is a personality adaptor which is specific to the type of CPU being used on the CPU based board being tested.

8. An apparatus according to claim 1, wherein the third signal is a general strobe signal which is synchronised with the CPU clock.

9. An apparatus according to claims 1, wherein the third signal is a data strobe signal which is indicative of whether data is valid in the bus cycle.

10. An apparatus according to claims 1, wherein the third signal comprises a fourth and a fifth signal, the fourth signal being a general strobe signal which is synchronised with a CPU clock and the fifth signal being a data strobe signal which is indicative of whether data is valid in the bus cycle.

11. An apparatus according to claim 1, wherein the sample means to provide the third signal comprises a personality adaptor which is specific to each type of CPU being used on the CPU based board being tested.

12. An apparatus according to claim 11, wherein the personality adaptor provides the second signal and the third signal.

13. An apparatus according to claim 1, wherein the probe means is a single test probe.

14. An apparatus according to claim 1, wherein the probe means is a test fixture comprising a plurality of test probes which are selected by a multiplexer to determine which test point is sampled by the respective test probe.

15. An apparatus according to claim 14, wherein the test fixture is a bed of nails test fixture.

16. An apparatus according to claim 1, wherein the storage means includes a feedback loop for combining the oldest signal stored in the storage means with the newest signal to be input into the storage means and removing the oldest signal from the storage means.

17. An apparatus according to claim 1, wherein the storage means is a shift register.

18. An apparatus according to claim 17, wherein the shift register comprises a data shift register for combining a data strobe signal which is indicative of whether data is valid in the bus cycle with the test signal and for storing the combined signal in the data shift register, the data shift register being a 16-bit shift register.

19. An apparatus according to claim 16, wherein the storage means comprises a general shift register for combining a general strobe signal which is synchronised with the CPU clock with the first signal and for storing the combined signal in the general shift register, the general shift register being a 16-bit shift register.

20. An apparatus according to claim 1, wherein the first signal and the third signal are provided to the storage means for a predetermined number of bus cycles performed by the CPU.

21. An apparatus according to claim 20, wherein the predetermined number of bus cycles performed by the CPU is 64,000.

22. An apparatus according to claim 1, wherein the second signal is delivered for a time greater than the time taken for the CPU to complete a power on self test.

23. An apparatus according to claim 1, wherein a bus cycle counter is provided to count the number of second signals.

24. An apparatus according to claim 1, wherein a transition detection means is provided to detect a transition of the state of the first signal and to provide a signal to stop a test of the CPU based board.

25. An apparatus according to claim 24, wherein the transition detected by the transition detection means is a trailing edge of the first signal.

26. An apparatus for testing a CPU based board including a CPU and at least one clock producing a CPU clock signal, the apparatus comprising:

a probe operable to receive a test signal from a test point on the CPU based board;

a personality adaptor coupled to the CPU, the personality adaptor operable to receive signals from the CPU as the CPU operates in response to the CPU clock signal, and in response to the signals from the CPU, operable to produce a BUS CYCLE ON signal and a strobe signal;

a controller communicative with the personality adaptor, the controller operable to receive the BUS CYCLE ON signal and the strobe signal; and a storage device communicative with the controller, the storage device operable to combine the test signal and the strobe signal when the BUS CYCLE ON signal indicates that the CPU is performing a bus cycle and operable to store a signature of the test point on the CPU based board.

27. An apparatus for testing a CPU based board including a CPU and at least one clock producing a CPU clock signal, the apparatus comprising:

a probe operable to receive a test signal from a test point on the CPU based board;

a personality adaptor coupled to the CPU, the personality adaptor operable to receive signals from the CPU as the CPU operates in response to the CPU clock signal, and in response to the signals from the CPU, operable to provide a BUS CYCLE ON signal, a data strobe signal, and a general strobe signal synchronized to the CPU clock signal;

a system controller communicative with the personality adaptor, the controller operable to receive the BUS CYCLE ON signal and the data and general strobe signals;

a timing generator coupled to the system controller, the timing generator operable to receive the data and general strobe signals from the system controller, the timing generator coupled to the CPU based board to provide a reset signal to the CPU based board;

a first shift register coupled to the test probe and the timing generator, operable to combine the general strobe signal and the test signal when the BUS CYCLE ON signal indicates that the CPU is performing a bus cycle, and operable to store a first signature of the test point on the CPU based board; and a second shift register coupled to the test probe and the timing generator, operable to combine the data strobe signal and the test signal when the BUS CYCLE ON signal indicates that the CPU is performing a bus cycle, and operable to store a second signature of the test point on the CPU based board.

* * * * *